(12) United States Patent
Haynes

(10) Patent No.: US 8,522,334 B2
(45) Date of Patent: Aug. 27, 2013

(54) MOBILE MIDDLEWARE FOR GENERIC BOOTSTRAPPING ARCHITECTURE

(75) Inventor: Thomas W. Haynes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 12/970,299

(22) Filed: Dec. 16, 2010

(65) Prior Publication Data

US 2012/0159602 A1  Jun. 21, 2012

(51) Int. Cl.
*G06F 7/04* (2006.01)

(52) U.S. Cl.
USPC .............................................................. 726/9

(58) Field of Classification Search
None
See application file for complete search history.

(56) References Cited

U.S. PATENT DOCUMENTS

2009/0304009 A1* 12/2009 Kolhi et al. ................... 370/400

\* cited by examiner

*Primary Examiner* — Brandon Hoffman

(57) ABSTRACT

A mobile terminal receives a Global Bootstrapping Architecture (GBA) authentication request from an application client, executing on a processor of the device, in non-standard GBA syntax. The mobile terminal converts the GBA authentication request into standard GBA syntax for a Universal Integrated Circuit Card (UICC) and sends the GBA authentication request having standard GBA syntax to the UICC. The mobile terminal receives, from the UICC, GBA authentication information responsive to the GBA authentication request, the GBA authentication information having standard GBA syntax, and converts, the GBA authentication information having standard GBA syntax into GBA authentication information having non-standard GBA syntax supported by the application client.

20 Claims, 6 Drawing Sheets

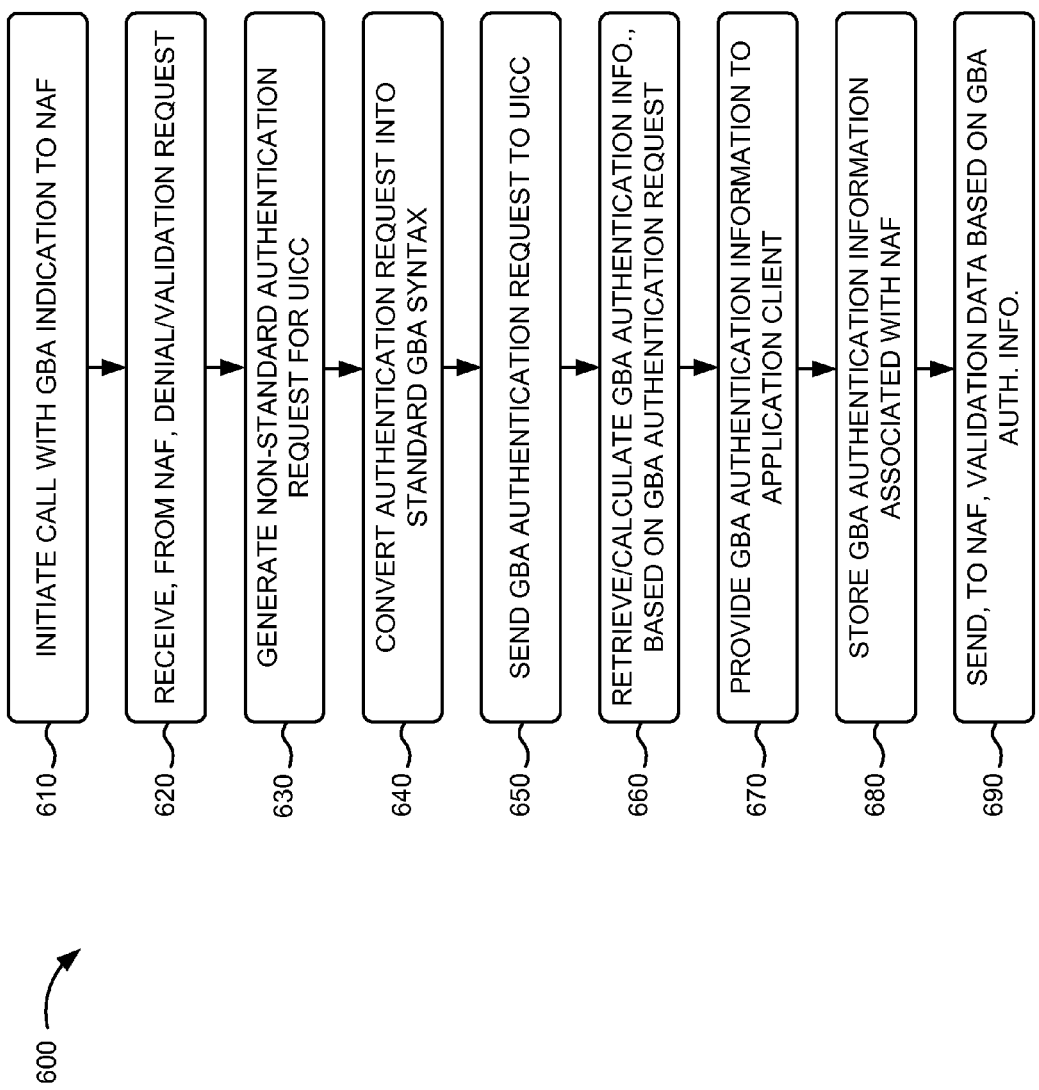

MOBILE MIDDLEWARE FOR GENERIC BOOTSTRAPPING ARCHITECTURE

BACKGROUND

Mobile terminals may utilize Universal Integrated Circuit Cards (UICCs) to access various types of networks. A UICC is a smart card used in mobile terminals in global system for mobile communications (GSM) and universal mobile telecommunications system (UMTS) networks. The UICC ensures the integrity and security of personal data.

Generic bootstrapping architecture (GBA) is a standard defined by the Third Generation Partnership Project (3GPP) for an authentication of a user of a mobile terminal. GBA relies on a shared secret between the mobile terminal (e.g., a client) and an application server. The client and the server are mutually authenticated through an intermediary server, referred to as a bootstrapping server function (BSF), that arranges a security relation between the client and the application server. In an enhanced form of GBA (referred to as GBA_U), the UICC on the mobile terminal is used to authenticate the user to the BSF. Once authenticated to the BSF, the mobile terminal may access the application server (also referred to as a network application function (NAF)) to obtain services. The NAF may communicate with the BSF to validate and authorize the mobile terminal's access.

The mobile terminal communicates with the UICC through interface(s) defined by standards, such as 3GPP Technical Specification (TS) 31.101. These standards ensure interoperability between the UICC and the mobile terminal independent of the respective manufacturer, card issuer, or operator.

BRIEF DESCRIPTION OF THE DRAWINGS

FIG. 6 is a flowchart of an example process for obtaining GBA authentication for an application client on a mobile terminal, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may allow generic bootstrapping architecture (GBA) to be used to authenticate users for third-party applications executed on a mobile terminal. The systems and/or methods may provide a standard interface to Universal Integrated Circuit Card (UICC) GBA commands that are required by the third-party application to authenticate to a network application function (NAF). The interface may include a set of procedures, functions, a shared library, or an application that facilitates third-party application communication to the UICC for the purpose of GBA authentication. Additionally, the interface may store previously used GBA authentication information so that the mobile terminal can access multiple NAFs without having to generate new credentials each time the mobile terminal reconnects to a NAF.

As used herein, the terms "subscriber" and/or "user" may be used interchangeably. Also, the terms "subscriber" and/or "user" are intended to be broadly interpreted to include a mobile terminal (e.g., a mobile communication device) or a user of a mobile terminal.

Figure 1:
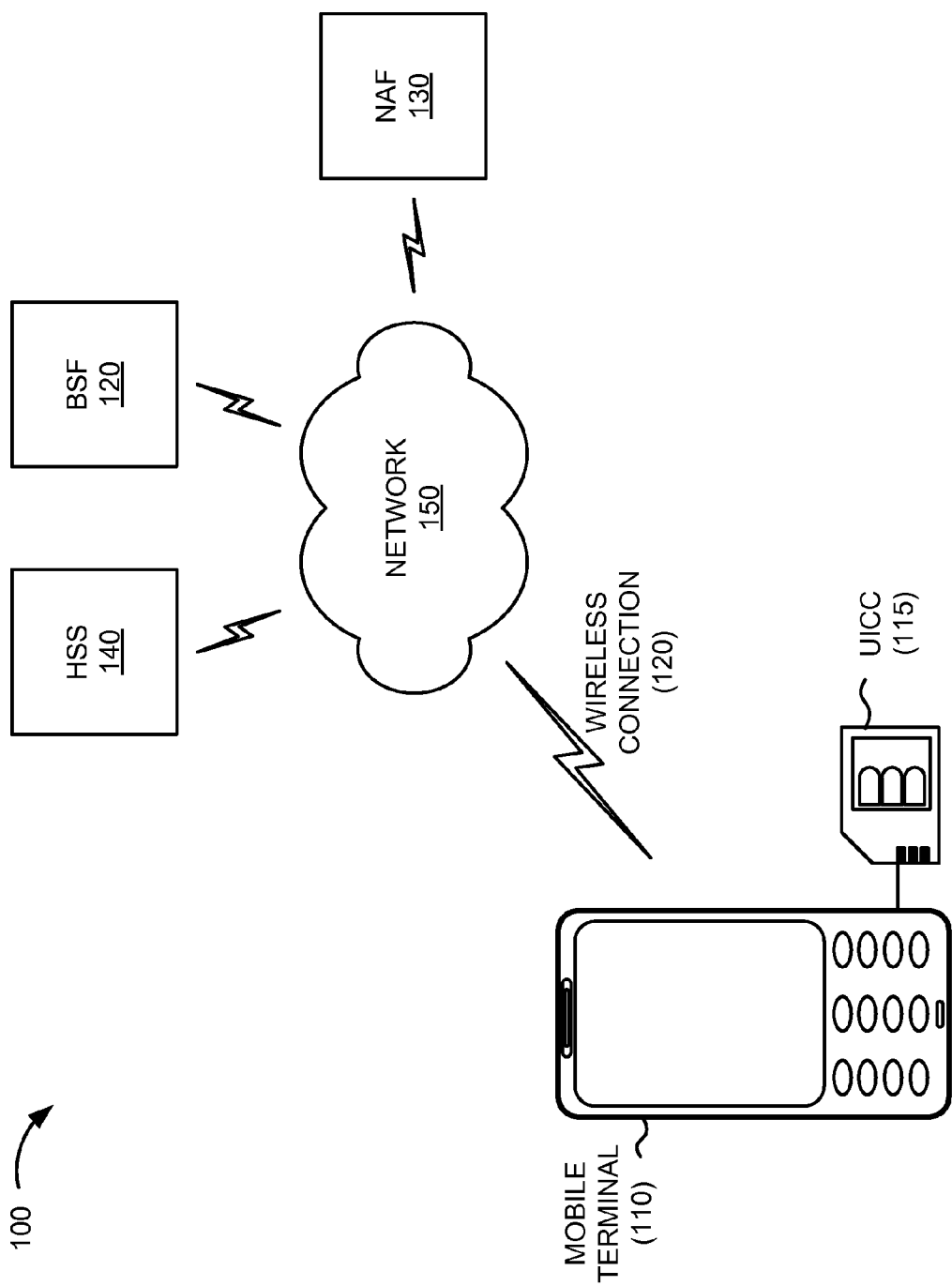
FIG. 1 is a diagram illustrating an example network in which systems and/or methods described herein may be implemented.

FIG. 1 is a diagram of an example network 100 in which systems and/or methods described herein may be implemented. As illustrated, network 100 may include a mobile terminal 110 with a UICC 115, a bootstrapping server function (BSF) 120, a network application function (NAF) 130, and a home subscriber server (HSS) 140 interconnected by a network 150. Components of network 100 may interconnect via wired and/or wireless connections. A single mobile terminal 110, UICC 115, BSF 120, NAF 130, HSS 140, and network 150 have been illustrated in FIG. 1 for simplicity. In practice, there may be more mobile terminals 110, UICCs 115, BSFs 120, NAFs 130, HSSs 140, and/or networks 150.

The term "mobile terminal," as used herein, is intended to be broadly interpreted to include a device that may utilize a smart card (e.g., UICC 115). Mobile terminal 110 may communicate (e.g., with BSF 120 and/or NAF 130) via network 150. Mobile terminal 110 may include a mobile device or a stationary device using a wireless interface. For example, mobile terminal 110 may include a computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a computer (e.g., personal computer, a laptop computer, or a tablet computer), a global positioning system (GPS) device, a content recording device (e.g., a camera, a video camera, etc.), a gaming device, a television set-top-box, etc. In implementations described herein, mobile terminal 110 may include one or more application clients that may connect an NAF to provide services to a user.

UICC 115 may correspond to a UICC or another type of smart card. UICC 115 may include an integrated circuit and may facilitate the connection of mobile terminal 110 to network 150. UICC 115 may include information that identifies a particular subscription to network 100 (e.g., a particular subscriber). UICC 115 may include a one or more Subscriber Identity Module (SIMs). UICC 115 may request data from network devices and perform calculations, based on the requested data, to authenticate users of mobile terminal 110.

BSF 120 may include one or more server devices, or other types of computation or communication devices, that gather, process, and/or provide information in a manner described herein. For example, BSF 120 may act as an intermediary element in network 150 that provides application independent functions for mutual authentication of mobile terminals (e.g., mobile terminal 110) and application servers (e.g., NAF 130) to each other and for "bootstrapping" the exchange of secret session keys afterwards. The bootstrap procedure may be initiated, for example, during initial power-up of mobile terminal 110 or in response to a message from a device in network 150 instructing mobile device 110 to begin a bootstrap operation.

NAF 130 may include one or more server devices, or other types of computation or communication devices, that gather, process, and/or provide information in a manner described herein. For example, NAF 130 may include an application sever to provide applications, data, and/or services to mobile terminal 110. In one example implementation, NAF 130 may be a web server that hosts a website from which mobile terminal 110 can receive applications, data, and/or services. In another example, NAF 130 may be a content delivery server that provides broadcast video streams, Video on Demand (VoD) content, or other multimedia content. In other implementations, NAF 130 may provide location-based services.

HSS 140 may include one or more server devices, or other computation or communication devices that store information about subscribers (e.g., users of mobile terminals 110). For example, HSS 140 may store information associated with a UICC associated with a subscriber, services that the subscriber has requested or been assigned, settings associated with the services, and/or a current location of the subscriber. In one implementation, HSS 140 may provide this information to BSF 120.

Network 150 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless UMTS, wireless CDMA, etc.), or a combination of networks. In one implementation, network 230 may include a wireless core network, an IP multimedia subsystem (IMS) network, and one or more other networks.

In implementations described herein, devices in network 100 may perform GBA authentication of mobile terminal 110. Mobile terminal 110 may send a hypertext transfer protocol (HTTP) request to BSF 120 that includes a user identity (e.g., an IP multimedia private identity (IMPI) or a temporary IP multimedia private identity (TMPI)). BSF 120 may communicate with HSS 140 to obtain GBA User Security Settings (GUSS) and a random number (RAND) that is used to calculate an authentication vector. BSF 120 may send the authentication vector and the RAND to mobile terminal 110. Mobile terminal 110 may use this information to calculate a corresponding authentication vector based on user secure settings stored in the UICC. Mobile terminal 110 may send the calculated values to BSF 120 for verification. Assuming the calculated values match, mobile terminal 110 may be considered authenticated and BSF 120 may provide a Bootstrapping Transaction Identifier (B-TID) and a key lifetime value to mobile terminal 110. Both mobile terminal 110 and BSF 120 may independently derive an actual key, referred to as a Ks_NAF, that may be used to secure communications between mobile terminal 110 and NAF 130. Generally, mobile terminal 110 may provide the B-TID to NAF 130 when initiating a GBA-enabled session. NAF 130 may then communicate with BSF 120 to validate mobile terminal 110 and obtain the Ks_NAF for the session.

To perform GBA authentication, mobile terminal 110 may communicate with UICC 115 through standards-based interfaces (e.g., 3GPP TS 31.101). While these standard interfaces are generally available to the mobile operating system of mobile terminal 110, they are not generally available to particular applications that establish sessions with NAF 130. In implementations described herein, a middleware function may be provided to enable applications executing on mobile terminal 110 to initiate GBA authentication procedures and obtain GBA authentication information (e.g., a B-TID and a key lifetime from BSF 120, and a KS_NAF from UICC 115) for application-initiated sessions.

Although FIG. 1 shows example devices of network 100, in other implementations, network 100 may include fewer devices, different devices, differently arranged devices, or additional devices/networks than depicted in FIG. 1. Alternatively, or additionally, one or more devices of network 100 may perform one or more other tasks described as being performed by one or more other devices of network 100.

Figure 2:
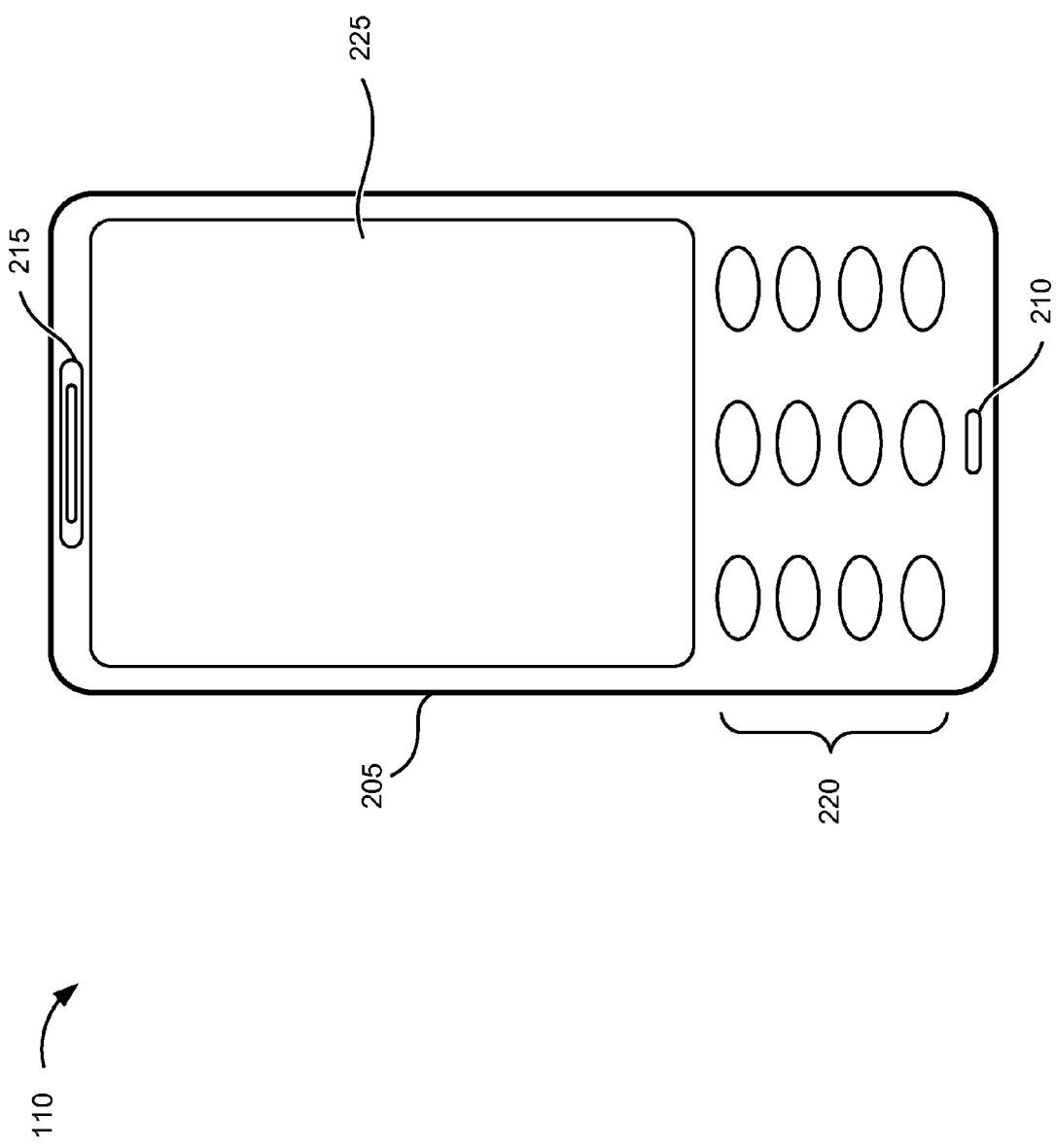
FIG. 2 is a diagram illustrating an example of a mobile terminal depicted in FIG. 1.

FIG. 2 is a diagram of an example mobile terminal 110. As illustrated in FIG. 2, mobile terminal 110 may include a housing 205, a microphone 210, a speaker 215, a keypad 220, and a display 225.

Housing 205 may include a structure to contain components of mobile terminal 110. For example, housing 205 may be formed from plastic, metal, or some other material. Housing 205 may support microphone 210, speakers 215, keypad 220, and display 225.

Microphone 210 may include an input device that converts a sound wave to a corresponding electrical signal. For example, the user may speak into microphone 210 during a telephone call or to execute a voice command. Speaker 215 may include an output device that converts an electrical signal to a corresponding sound wave. For example, the user may listen to music, listen to a calling party, or listen to other auditory signals through speaker 215.

Keypad 220 may include an input device that provides input into mobile terminal 110. Keypad 220 may include a standard telephone keypad, a QWERTY keyboard, and/or some other type or arrangement of keys. Keypad 220 may also include one or more special purpose keys. The user may utilize keypad 220 as an input component to mobile terminal 110. For example, the user may use keypad 220 to enter information, such as alphanumeric text, to access data, or to invoke a function or an operation.

Display 225 may include an output device that outputs visual content, and/or may include an input device that receives user input (e.g., a touch screen (also known as a touch display)). Display 225 may be implemented according to a variety of display technologies, including but not limited to, a liquid crystal display (LCD), a plasma display panel (PDP), a field emission display (FED), a thin film transistor (TFT) display, or some other type of display technology. Additionally, display 225 may be implemented according to a variety of sensing technologies, including but not limited to, capacitive sensing, surface acoustic wave sensing, resistive sensing, optical sensing, pressure sensing, infrared sensing, gesture sensing, etc. Display 225 may display text, images, and/or video to the user. Display 225 may also display a user interface (e.g., a graphical user interface (GUI)) of mobile terminal 110 or a user interface of some other device in which mobile terminal 110 controls, a user interface associated with applications, or the like.

Although FIG. 2 shows example components of mobile terminal 110, in other implementations, mobile terminal 110 may contain fewer components, different components, differently arranged components, or additional components than depicted in FIG. 2. Alternatively, or additionally, one or more components of mobile terminal 110 may perform one or more other tasks described as being performed by one or more other components of mobile terminal 110.

Figure 3:
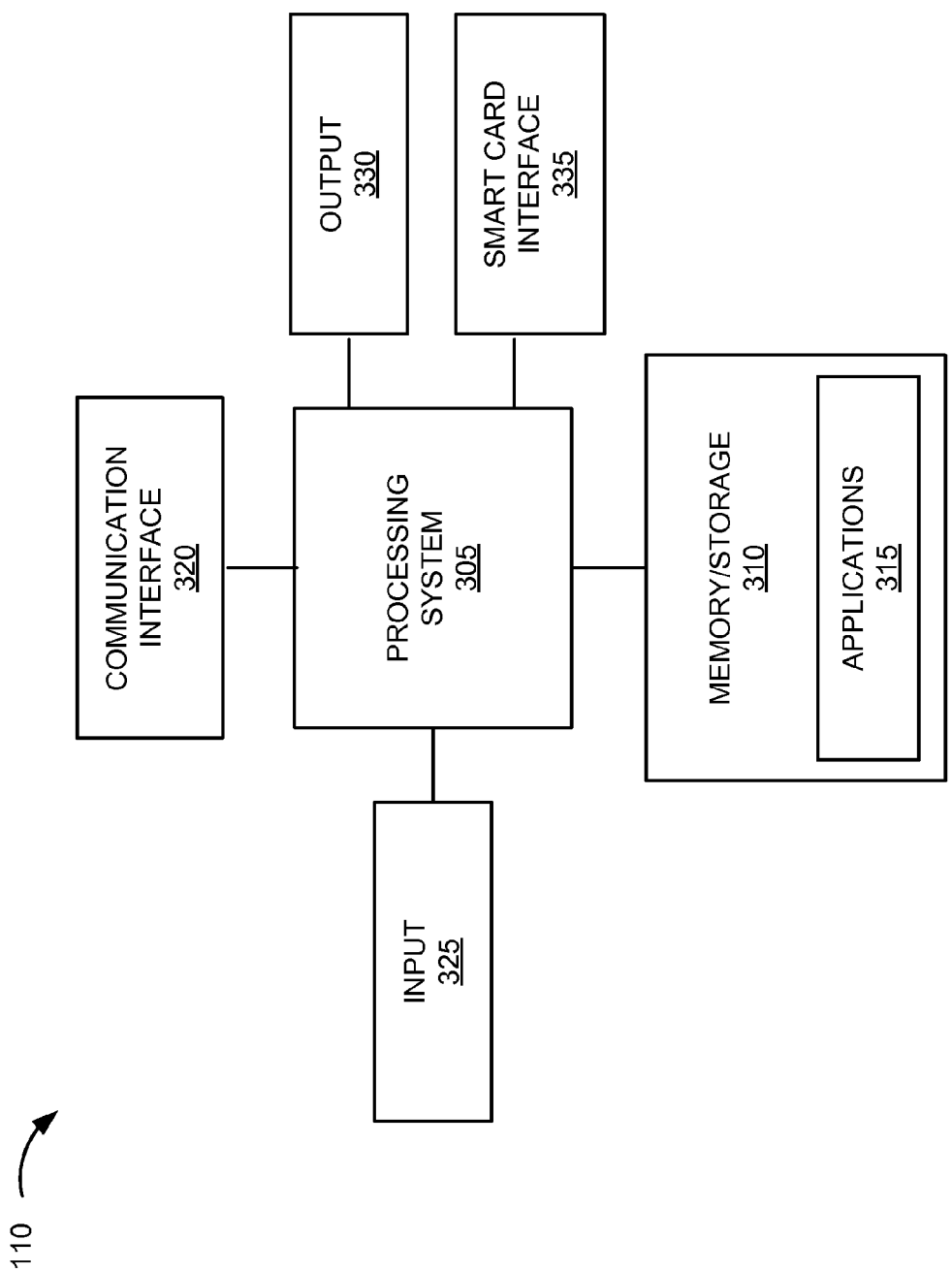
FIG. 3 is a diagram illustrating example components of the mobile terminal.

FIG. 3 is a diagram illustrating example components of mobile terminal 110. As illustrated, mobile terminal 110 may include a processing system 305, memory/storage 310 including applications 315, a communication interface 320, an input 325, an output 330, and a smart card interface 335.

Processing system 305 may include one or more processors, microprocessors, data processors, co-processors, network processors, application specific integrated circuits (ASICs), controllers, programmable logic devices (PLDs), chipsets, field programmable gate arrays (FPGAs), and/or some other component that may interpret and/or execute instructions and/or data. Processing system 305 may control the overall operation, or a portion thereof, of mobile terminal 110, based on, for example, an operating system (not illustrated) and/or various applications (e.g., applications 315). Processing system 305 may access instructions from memory/storage 310, from other components of mobile terminal 110, and/or from a source external to mobile terminal 110 (e.g., a network or another device).

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Memory/storage 310 may store data, application(s), and/or instructions related to the operation of mobile terminal 110. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 320 may include a component that permits mobile terminal 110 to communicate with other devices, networks (e.g., network 150), and/or systems. For example, communication interface 320 may include some type of wireless and/or wired interface.

Input 325 may include a component that permits the user and/or another device to input information into mobile terminal 110. For example, input 325 may include a keypad (e.g., keypad 220), a button, a switch, a knob, fingerprint recognition logic, retinal scan logic, a web cam, voice recognition logic, a touchpad, an input port, a microphone (e.g., microphone 210), a display (e.g., display 225), and/or some other type of input component. Output 330 may include a component that permits mobile terminal 110 to output information to the user and/or another device. For example, output 330 may include a display (e.g., display 225), light emitting diodes (LEDs), an output port, a speaker (e.g., speaker 215), and/or some other type of output component.

Smart card interface 335 may provide an interface between mobile terminal 110 and UICC 115. For example, smart card interface 335 may include a component to permit communication between mobile terminal 110 and UICC 115 when UICC 115 is inserted in mobile terminal 110. In implementations described herein, smart card interface 335 may also include an interface to GBA commands on UICC 115 that may be needed by an application (e.g., one of applications 315) to authenticate to NAF 130. For example, smart card interface 335 may include a set of procedures, functions, a shared library, or another application that facilitates communication between the application (e.g., one of applications 315) and UICC 115 for purposes of GBA authentication.

As described herein, mobile terminal 110 may perform certain operations in response to processing system 305 executing software instructions contained in a computer-readable medium, such as memory/storage 310. The software instructions may be read into memory/storage 310 from another computer-readable medium or from another device via communication interface 320. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of mobile terminal 110, in other implementations, mobile terminal 110 may contain fewer components, different components, differently arranged components, or additional components than depicted in FIG. 3. Alternatively, or additionally, one or more components of mobile terminal 110 may perform one or more other tasks described as being performed by one or more other components of mobile terminal 110, or some combination thereof.

Figure 4:
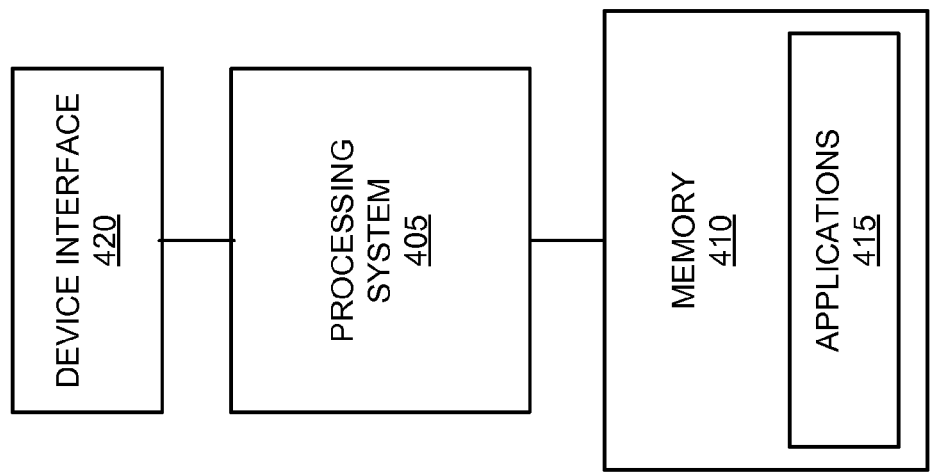
FIG. 4 is a diagram illustrating example components of a Universal Integrated Circuit Card (UICC) of FIG. 1.

FIG. 4 is a diagram illustrating example components of UICC 115. As illustrated, UICC 115 may include a processing system 405, a memory 410 including applications 415, and a device interface 420.

Processing system 405 may include one or more processors, microprocessors, data processors, co-processors, network processors, ASICs, controllers, PLDs, chipsets, FPGAs, and/or some other component that may interpret and/or execute instructions and/or data. Processing system 405 may control the overall operation, or a portion thereof, of UICC 115, based on, for example, an operating system (not illustrated) and/or various applications (e.g., applications 415). Processing system 405 may access instructions from memory 410, from other components of UICC 115, and/or from a source external to UICC 115 (e.g., mobile terminal 110).

Memory 410 may include a memory device. For example, memory 410 may include a RAM, a DRAM, a ROM, a PROM, an electrically erasable PROM (EEPROM), a flash memory, and/or some other type of memory. Memory 410 may store data, applications 415, and/or instructions related to the operation of UICC 115.

Applications 415 may include applications associated with various network standards, such as Global System for Mobile Communications (GSM), code division multiple access (CDMA), LTE, IMS, UMTS, etc. In one implementation, applications 415 may include a client-side GBA application that acts according to GBA protocols to calculate a secret key (e.g., Ks_NAF) that can be used to authenticate a user of mobile terminal 210 to, for example, NAF 130.

Device interface 420 may include an interface between mobile terminal 110 and UICC 115. For example, device interface 420 may include electronic circuitry to permit communication between mobile terminal 110 and UICC 115 when UICC 115 is inserted in mobile terminal 110. Device interface 420 may serve as an input/output mechanism for UICC 115.

Although FIG. 4 shows example components of UICC 115, in other implementations, UICC 115 may contain fewer components, different components, differently arranged components, or additional components than depicted in FIG. 4. Alternatively, or additionally, one or more components of UICC 115 may perform one or more other tasks described as being performed by one or more other components of UICC 115.

Figure 5:
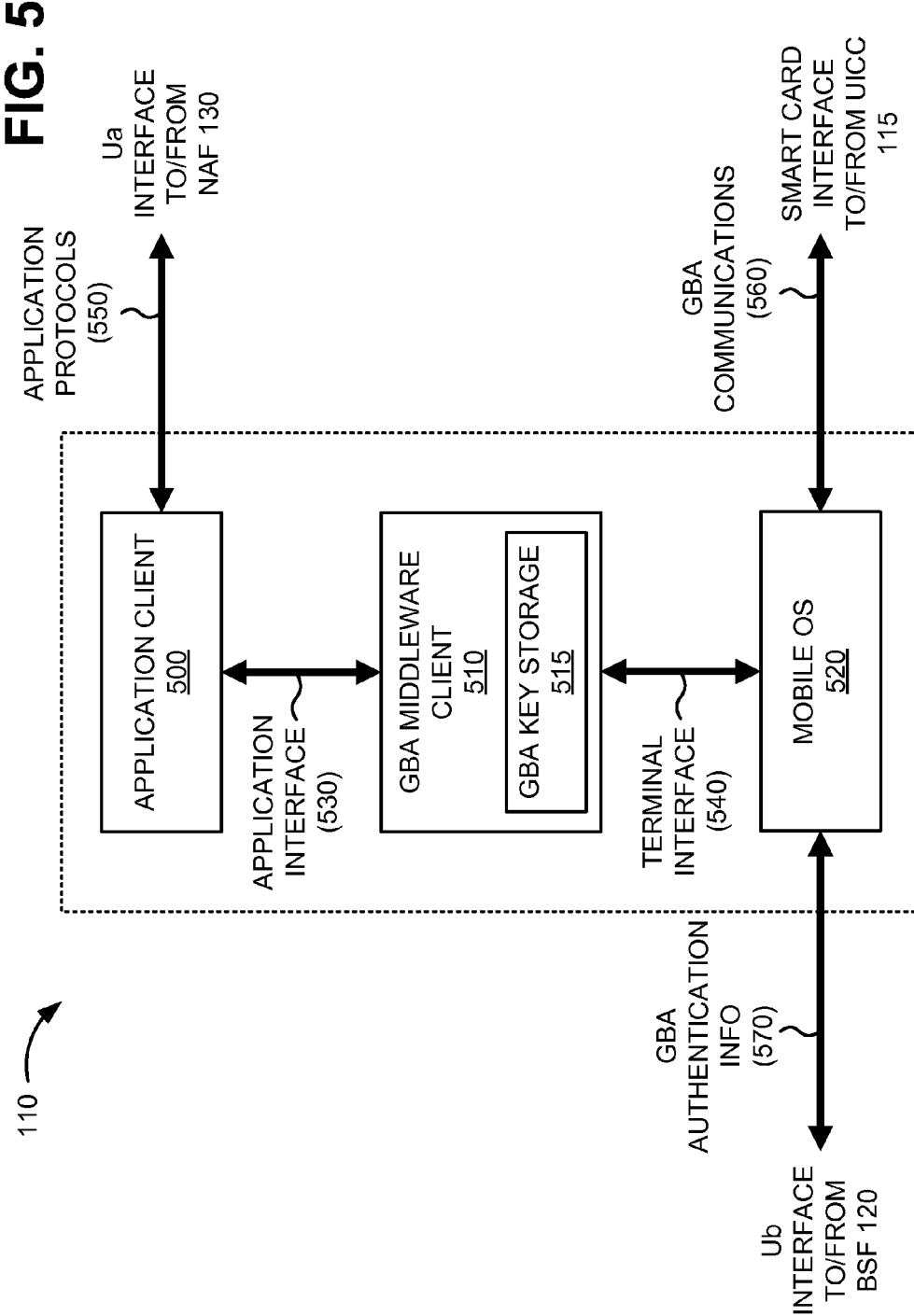
FIG. 5 is a diagram of illustrating example functional components of the mobile terminal.

FIG. 5 is a diagram of example functional components mobile terminal 110. In one implementation, the functions described in connection with FIG. 5 may be performed by one or more components described in FIG. 3. As shown in FIG. 5, mobile terminal 110 may include an application client 500, a GBA middleware client 510 that includes GBA key storage 515, and a mobile operating system (OS) 520.

Application client 500 may include a program or application that executes on mobile terminal 110 to provide a service from a network device (e.g., NAF 130). In one implementation, application client 500 may correspond to one of applications 315 (FIG. 3). For example, application client 500 may include a GBA-enabled application, such as a media player that receives streaming media content from NAF 130 and presents the streaming media to a user. In other implementations, application client may include a web browser or a client with a proprietary application protocol.

Application client 500 may (e.g., based on a user selection of an application) interact with NAF 130 via a Ua interface to obtain services selected by the user. The Ua interface may be defined as the reference point between mobile terminal 110 and NAF 130 that carries the application protocol and is secured by deriving keys based on the key material agreed between mobile terminal 110 and BSF 120 as a result of authentication and key agreement procedures conducted over a Ub reference point. In one implementation, the interactions between application client 500 and NAF 130 may be performed using the HTTP. In another implementation, the interactions between application client 500 and NAF 130 may be performed using another type of protocol.

GBA middleware client 510 may include hardware or a combination of hardware and software to provide an interface between application client 500 and mobile OS 520/UICC 115. Generally, mobile terminal 110 may communicate with UICC 115 through published standard-group interfaces (e.g., defined in the 3GPP GBA Technical Specification). The interface specification may be available to an operating system implemented on mobile terminal 110 (e.g., mobile OS 520), but may not be consistently included in applications (e.g., application client 500). Thus, GBA middleware client 510 may provide an application interface 530 and a terminal interface 540 to manage GBA-based communications between application client 500 and mobile OS 520/UICC 115.

In one implementation, GBA middleware client 510 may also include one or more memory devices (e.g., memory/storage 310, key storage 515, etc.) to store standards-based interfaces for UICC GBA commands. In one implementation, the standards-based interfaces for UICC GBA commands may be stored in one or more libraries. A library may be a block of memory locations (contiguous or non-contiguous memory locations) that stores a set of related rules, functions, or subroutines. In another implementation, standards-based interfaces for UICC GBA commands may be stored in another manner (e.g., as database records, tables, linked lists, etc.).

Application interface 530 may receive GBA authentication requests from application client 500 in a non-standard (for GBA-purposes) format, and may provide the GBA authentication requests to mobile OS 520/UICC 115 in a format consistent with UICC GBA specifications. Conversely, application interface 530 may receive GBA authentication information (e.g., in a format consistent with UICC GBA specifications) from mobile OS 520/UICC 115 and may provide the GBA authentication information to application client 500 (e.g., in a format usable by application client 500). In one implementation, application interface 530 may support a variety of different mobile operating systems. The operating systems supported by application interface 530 on mobile terminal 110 may include, for example, Symbian OS and Maemo from Nokia, Android from Google, iOS from Apple, BlackBerry OS from RIM, Windows Phone OS from Microsoft, Linux, Palm WebOS, the Bada operating system from Samsung, etc.

Terminal interface 540 may communicate with mobile OS 520 using standards in the 3GPP UICC terminal interface specification (e.g., 3GPP TS 31.101) for purposes of GBA_U_ME authentication. Based on GBA_U standards, GBA application middleware 510 may convert non-standard GBA authentications requests from application client 500 (e.g., received via application interface 530) into standard GBA commands that mobile OS 520 may provide to UICC 115. In one implementation, GBA middleware client 510 may include a group of call functions to a library (e.g., a Java class library, a C library, etc.) within another memory component (e.g., memory/storage 310). In another implementation, the group of call functions may be included within application client 500, such that application client 500 and GBA middleware client 510 may be combined as a single functional component.

Mobile OS 520 may receive standard GBA commands via terminal interface 540 and provide the standard GBA commands to UICC 115. Mobile OS 520/UICC 115 may interact with BSF 120 via a Ub interface to obtain GBA authentication. The Ub interface may refer to the reference point between mobile terminal 110 and BSF 120. A mutual authentication procedure between UICC 115 (via mobile OS 520) and BSF 120 may take place using the Ub interface, and session keys may be bootstrapped based on GBA authentication and key agreement standards. For example, based on the GBA authentication request from application client 500, mobile OS 520 may initiate a GBA_U process to establish a secure key (referred to as Ks or the GBA_U key) by deriving the secure key, Ks, from another key (a subscriber authentication key) that is shared between UICC 115 and HSS 140. Mobile OS 520 may, thus, exchange information between UICC 115 and BSF 120.

According to an implementation described herein, application client 500 may request services from NAF 130, via the Ua interface, using application protocols 550. NAF 130 may require GBA authentication of application client 500 before NAF 130 can provide the requested services. Thus, NAF 140 may deny the request from application client 500 and provide a request to application client 500 to provide authentication. Application client 500 may receive the request for authentication and generate a signal to UICC 115 (e.g., via GBA middleware client 510 and mobile OS 520) to initiate BSF functionality. Particularly, application client 500 may send a GBA authentication request, via application interface 530, to request GBA authentication information. GBA middleware client 510 may receive the GBA authentication request (e.g., in the syntax of application client 500) and may convert the GBA authentication request into standard GBA syntax for mobile OS 520/UICC 115. GBA middleware client 510 may provide the GBA authentication request (e.g., in standard GBA syntax) to mobile OS 520 via terminal interface 540.

Mobile OS 520 may receive the GBA authentication request and may communicate with UICC 115 to provide the GBA authentication request to UICC 115, as indicated by reference 560. UICC 115 may respond to the GBA authentication request by obtaining requests, calculations, time periods, and/or keys (generically referred to herein as "GBA authentication information") in accordance with GBA standards to authenticate UICC 115/application client 500 with BSF 120. In one implementation, mobile OS 520 may provide GBA authentication information to BSF 120, and may receive GBA authentication information from BSF 120, via the Ub interface, as indicated by reference number 570.

Once UICC 115 has completed authentication procedures with BSF 120, UICC 115 may provide a Ks_NAF to mobile OS 520. Mobile OS 520 may forward the GBA authentication information (e.g., a B-TID and a key lifetime from BSF 120, and a KS_NAF from UICC 115) to GBA middleware client 510 (e.g., via terminal interface 540). GBA middleware client 510 may receive the GBA authentication information and may convert the GBA authentication information into syntax of application client 500. GBA middleware client 510 may then provide the GBA authentication information to application client 500, via application interface 530. Application client 500 may use the GBA authentication information to send validation data (e.g., the B-TID), along with a renewed request for services to NAF 130 via the Ua interface, as indicated by reference number 550. NAF 130 may then retrieve, based on the B-TID, the key lifetime and Ks_NAF from BSF 120 to verify application client 500 before providing the requested services to application client 500.

In one implementation, GBA middleware client 510 may include GBA key storage 515. GBA key storage 515 may include a memory component (e.g., memory 310) to store GBA authentication information (e.g., a B-TID, a lifetime, and a Ks_NAF) associated with a particular application client 500. For example, GBA key storage 515 may store the converted verification data provided to application client 500 via application interface 530. If a different application client later initiates a GBA-enabled session with a different NAF, the GBA authentication information associated with the particular application client 500 may be overwritten. Thus, GBA middleware client 510 may store GBA authentication information associated with the particular application client 500 in GBA key storage 515 to permit application client 500 use the GBA authentication information for the full lifetime of the GBA authentication information. In one implementation, GBA key storage 515 may be used as a back-up of GBA authentication information stored by application client 500. In another implementation, GBA key storage 515 may be included as part of application client 500 (e.g., such that each of multiple application clients 500 may store its own GBA authentication information).

After completing an initial verification/session with NAF 130, application client 500 may later retrieve verification data (e.g., the B-TID) from GBA key storage 515 and/or UICC 115 to provide to NAF 130 as part of an application request. If verification data is not available or if the verification data has expired, application client 500 may be required to initiate GBA authentications procedures with BSF 120.

Although FIG. 5 shows example functional components of mobile terminal 110, in other implementations, mobile terminal 110 may contain fewer functional components, different functional components, differently arranged functional components, or additional functional components than depicted in FIG. 5. Alternatively, or additionally, one or more functional components of mobile terminal 110 may perform one or more other tasks described as being performed by one or more other functional components of mobile terminal 110.

FIG. 6 is a flow chart of an example process 600 for obtaining GBA authentication for an application client on a mobile terminal, according to an implementation described herein. In one example implementation, process 600 may be performed by mobile terminal 110. In other implementations, some or all of process 600 may be performed by another device or group of devices including or excluding mobile terminal 110.

As shown in FIG. 6, process 600 may include initiating a call, with a GBA indication, to a NAF (block 610) and receiving, from the NAF, a denial and/or a validation request (block 620). For example, as described above in connection with FIG. 5, application client 500 may request services from NAF 130, via the Ua interface, using application protocols 540. NAF 130 may require GBA authentication of application client 500 before NAF 130 can provide the requested services. Thus, NAF 140 may deny the request from application client 500 and provide a request to application client 500 to provide authentication. Application client 500 may receive the request for authentication.

A non-standard authentication request, for a UICC, may be generated (block 630), the authentication request may be converted into standard GBA syntax (block 640), and the GBA authentication request may be sent to the UICC (block 650). For example, as described above in connection with FIG. 5, application client 500 may generate a signal to UICC 115 (e.g., via GBA middleware client 510 and mobile OS 520) to initiate BSF functionality. Particularly, application client 500 may send a GBA authentication request in a non-standard (for GBA-purposes) format, via application interface 530, to request GBA authentication information. GBA middleware client 510 may receive the GBA authentication request (e.g., in the syntax of application client 500) and may convert the GBA authentication request into standard GBA syntax for mobile OS 520/UICC 115. GBA middleware client 510 may provide the GBA authentication request (e.g., in standard GBA syntax) to mobile OS 520 via terminal interface 540. Mobile OS 520 may receive the GBA authentication request and may communicate with UICC 115 to provide the GBA authentication request to UICC 115, as indicated by reference 560.

GBA authentication information may be retrieved and/or calculated based on the GBA authentication request (block 660), and the GBA authentication information may be provided to the application client (block 670). For example, as described above in connection with FIG. 5, UICC 115 may respond to the GBA authentication request by obtaining requests, calculations, time periods, and/or keys (generically referred to herein as "GBA authentication information") in accordance with GBA standards to authenticate UICC 115/application client 500 with BSF 120. In one implementation, mobile OS 520 may provide GBA authentication information to BSF 120, and receive GBA authentication information from BSF 120, via the Ub interface, as indicated by reference number 570. Once UICC 115 has completed authentication procedures with BSF 120, UICC 115 may provide the Ks_NAF to mobile OS 520. Mobile OS 520 may forward the GBA authentication information (e.g., a B-TID and a key lifetime from BSF 120, and a KS_NAF from UICC 115) to GBA middleware client 510 (e.g., via terminal interface 540). GBA middleware client 510 may receive the GBA authentication information and may convert the GBA authentication information into syntax of application client 500. GBA middleware client 510 may then provide the GBA authentication information to application client 500, via application interface 530.

The GBA authentication information associated with the NAF may be stored (block 680) and validation data, based on the GBA authentication information, may be sent to the NAF (block 690). For example, as described above in connection with FIG. 5, GBA key storage 515 may include a memory component (e.g., memory 310) to store GBA authentication information (e.g., a B-TID, a lifetime, and a Ks_NAF) associated with a particular application client 500. For example, GBA key storage 515 may store the converted verification data provided to application client 500 via application interface 530. Application client 500 may use the GBA authentication information to send validation data (e.g., the B-TID), along with a renewed request for services to NAF 130 via the Ua interface, as indicated by reference number 550. NAF 130 may then verify application client 500 with BSF 120 before providing the requested services to application client 500.

Systems and/or methods, described herein, may receive a GBA authentication request from an application client, executing on a processor of a mobile terminal, in non-standard GBA syntax. The systems and/or methods may convert the GBA authentication request into standard GBA syntax for the UICC and may send the GBA authentication request, with standard GBA syntax, to the UICC. The systems and/or methods may receive, from the UICC, GBA authentication information responsive to the GBA authentication request, where the GBA authentication information may include standard GBA syntax. The systems and/or methods may convert the GBA authentication information from the standard GBA syntax into GBA authentication information that may include non-standard GBA syntax supported by the application client.

The foregoing description provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be changed in other implementations. Also, non-dependent blocks may be performed in parallel.

Also, certain functions have been described as being performed by UICC 115 and certain other functions have been described as being performed by mobile terminal 110. In other implementations, one or more of the functions, described as being performed by UICC 115, may be performed by mobile terminal 110; and/or one or more of the functions, described as being performed by mobile terminal 110, may be performed by UICC 115.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a mobile terminal, comprising:
   initiating, by an application client on a mobile terminal, a call to a network application function;
   receiving, by the application client and from the network application function, a denial/validation request;
   generating, by the application client, an authentication request that includes non-standard Global Bootstrapping Architecture (GBA) syntax;
   converting, by a middleware function on the mobile terminal, the authentication request from the non-standard GBA syntax into a GBA authentication request that includes standard GBA syntax for a Universal Integrated Circuit Card (UICC), wherein the middleware function provides an interface between the application client and an operating system of the mobile terminal;
   directing, by the middleware function, the GBA authentication request, in the standard GBA syntax, to the UICC via the operating system;
   receiving, by the application client, GBA authentication information from the UICC that is responsive to the GBA authentication request; and
   sending, by the application client and to the network application function, validation data based on the GBA authentication information.

2. The method of claim 1, further comprising:
   receiving, by the middleware function, the GBA authentication information from the UICC that is responsive to the GBA authentication request; and
   providing, to the application client, the GBA authentication information.

3. The method of claim 2, where, the GBA authentication information received from the UICC includes standard GBA syntax, and where the method further comprises:
   converting, by the middleware function, the GBA authentication information from the standard GBA syntax into syntax for the application client.

4. The method of claim 1, further comprising:
   storing, in a memory associated with the middleware function, the GBA authentication information, where the stored GBA authentication information is associated with the network application function.

5. The method of claim 4, further comprising:
   terminating a session with the network application function;
   retrieving, from the memory associated with the middleware function, the GBA authentication information associated with the network application function; and
   initiating, by the application client, another call to the network application function, where the other call includes validation data based on the GBA authentication information associated with the network application function.

6. The method of claim 1, where converting the authentication request with the non-standard GBA syntax includes selecting a library call function for a standard GBA syntax.

7. The method of claim 1, where the GBA authentication information includes a secure key associated with the network application function (Ks_NAF).

8. The method of claim 1, where the middleware function includes:
   software configured particularly for the mobile operating system,
   a library of GBA commands, or
   another application client.

9. A mobile device, comprising:
   a memory to store a plurality of instructions;
   a smart card interface, to enable communications between a processor and a Universal Integrated Circuit Card (UICC); and
   the processor to execute the instructions in the memory to:
      receive Global Bootstrapping Architecture (GBA) authentication requests from an application client, executing on the processor, in non-standard GBA syntax,
      convert the GBA authentication request into standard GBA syntax for the UICC,
      send the GBA authentication request, with the standard GBA syntax, to the UICC, receive GBA authentication information responsive to the GBA authentication request, the GBA authentication information including standard GBA syntax, and convert, the GBA authentication information from the standard GBA syntax into GBA authentication information that includes non-standard GBA syntax supported by the application client.

10. The mobile device of claim 9, where the processor is further to execute instructions in the memory to:
send, to the network application function, validation data for the application client based on the GBA authentication information.

11. The mobile device of claim 10, where the processor is further to execute instructions in the memory to:
terminate a session with the network application function;
retrieve, from the memory, the GBA authentication information associated with the network application function; and
initiate, from the application client, another call to the network application function, where the other call includes validation data based on the GBA authentication information associated with the network application function.

12. The mobile device of claim 9, where the processor is further to execute instructions in the memory to:
store, in the memory, the GBA authentication information, where the stored GBA authentication information is associated with the network application function.

13. The mobile device of claim 9, where converting the GBA authentication request includes selecting a call function from a library of standard GBA commands.

14. The mobile device of claim 9, where the GBA authentication information includes a Bootstrapping Transaction Identifier (B-TID), a secure key lifetime, and a secure key associated with the network application function (Ks_NAF).

15. One or more non-transitory computer-readable media storing instructions executable by one or more processors provided in a device of a wireless network, the media storing one or more instructions for:
generating an authentication request from an application client, the authentication request including non-standard Global Bootstrapping Architecture (GBA) syntax;
converting the authentication request from the non-standard GBA syntax into a GBA authentication request that includes standard GBA syntax for a Universal Integrated Circuit Card (UICC);
sending the GBA authentication request in the standard GBA syntax to the UICC;
receiving GBA authentication information from the UICC that is responsive to the GBA authentication request; and
sending, to the network application function and via the application client, validation data based on the GBA authentication information.

16. The media of claim 15, where the media further stores one or more instructions for:
receiving, in the standard GBA syntax, the GBA authentication information from the UICC that is responsive to the GBA authentication request; and
converting the GBA authentication information from the standard GBA syntax to GBA authentication information that includes non-standard GBA syntax supported by the application client.

17. The media of claim 15, where the media further stores one or more instructions for:
storing, in a memory, the GBA authentication information, where the stored GBA authentication information is associated with the network application function.

18. The media of claim 17, where the media further stores one or more instructions for:
terminating a session with the network application function;
retrieving, from the memory, the GBA authentication information associated with the network application function; and
initiating, via the application client, another call to the network application function, where the other call includes validation data based on the GBA authentication information associated with the network application function.

19. The media of claim 15, where the validation data includes a Bootstrapping Transaction Identifier (B-TID).

20. The media of claim 15, where the media includes:
a library of GBA commands.

* * * * *